(12) United States Patent
Sorin

(10) Patent No.: US 7,068,944 B2
(45) Date of Patent: Jun. 27, 2006

(54) MULTI-FUNCTION OPTICAL PERFORMANCE MONITOR

(75) Inventor: Wayne V. Sorin, Mountain View, CA (US)

(73) Assignees: Agilent Technologies, Inc., Palo Alto, CA (US); Novera Optics, INC, Santa Clara, CA (US)

( * ) Notice: Subject to any disclaimer, the term of this patent is extended or adjusted under 35 U.S.C. 154(b) by 650 days.

(21) Appl. No.: 10/120,925

(22) Filed: Apr. 10, 2002

(65) Prior Publication Data

US 2002/0149814 A1 Oct. 17, 2002

Related U.S. Application Data

(60) Provisional application No. 60/284,340, filed on Apr. 16, 2001.

(51) Int. Cl.
*H04B 10/00* (2006.01)

(52) U.S. Cl. .................. 398/152; 398/205; 398/65

(58) Field of Classification Search ............. 398/9, 398/148, 65, 10–38, 152, 205
See application file for complete search history.

(56) References Cited

U.S. PATENT DOCUMENTS

| 5,003,626 | A | 3/1991 | Kuwahara et al. |
| 5,477,369 | A | 12/1995 | Mahon et al. |
| 5,717,489 | A | 2/1998 | Ozeki et al. |
| 6,396,601 | B1 * | 5/2002 | Takara et al. .................. 398/9 |
| 6,501,580 | B1 * | 12/2002 | Ishikawa et al. ............ 398/148 |

* cited by examiner

Primary Examiner—David C. Payne

(57) ABSTRACT

An optical monitor that generates a signal indicative of at least two optical properties of an input optical signal. The monitor utilizes a polarization dependent beam splitter having a signal input port, a mixing signal input, a first output port and a second output port. The signal input port receives an input optical signal having first and second orthogonal polarization components. The mixing signal input receives an optical mixing signal having a first and second polarization component parallel to the first and second polarization components of the optical input signal, respectively. The polarization dependent beam splitter generates first and second output signals on the first and second output ports, respectively. The output signals are the sum of the like polarization components of the input optical signal and the optical mixing signal.

20 Claims, 2 Drawing Sheets

US 7,068,944 B2

MULTI-FUNCTION OPTICAL PERFORMANCE MONITOR

RELATED APPLICATIONS

This application claims the benefit under Title 35, United States Code Section 119(e) of U.S. Provisional Patent Application 60/284,340 filed Apr. 16, 2001.

FIELD OF THE INVENTION

The present invention relates to optical communication systems, and more particularly, to a device for monitoring a plurality of signal characteristics in an optical transmission.

BACKGROUND OF THE INVENTION

To simplify the following discussion, the present invention will be described in terms of an optical communication system in which signals are communicated over fiber optics. However, the monitoring system described herein can be applied to a variety of optical signals.

The ever-increasing bandwidth demands placed on optical networks have led to increased network speeds and wavelength-division multiplexing. These improvements place additional demands on the switching equipment used to route the various optical signals between bands and fibers. This increased complexity, in turn, makes it more difficult to diagnose failures in the various components that make up an optical network or to adjust various compensating devices within the network that correct for the various dispersions introduced by the fibers, amplifiers, and switching equipment.

For example, an optical signal can suffer distortions by being subjected to components that have a gain that varies with the wavelength of the signal. Similarly, the polarization of the signal can be altered in a manner that causes one of the two component linear polarizations to be delayed relative to the other. To correct such distortions, a device that can measure the signal strength, optical phase shift, and polarization of the signal as a function of wavelength is needed.

Broadly, it is the object of the present invention to provide an improved optical monitoring system for measuring multiple parameters in an optical network.

These and other objects of the present invention will become apparent to those skilled in the art from the following detailed description of the invention and the accompanying drawings.

SUMMARY OF THE INVENTION

The present invention is an optical monitor that generates a signal indicative of at least two optical properties of an input optical signal. The monitor utilizes a polarization dependent beam splitter having a signal input port, a mixing signal input, a first output port and a second output port. The signal input port receives an input optical signal having first and second orthogonal polarization components. The mixing signal input receives an optical mixing signal having a first and second polarization component parallel to the first and second polarization components of the optical input signal, respectively. The polarization dependent beam splitter generates first and second output signals on the first and second output ports, respectively. The first output signal includes the sum of the first polarization components of the input optical signal and the optical mixing signal, and the second output signal includes the sum of the second polarization components of the optical signal and the optical mixing signal. First and second light detectors receive the first and second output optical signals and generate electrical signals therefrom that are utilized by a processor for generating the signal indicative of the two optical properties. A mixing optical signal light source generates the mixing optical signal. The mixing optical light source is preferably constructed from a laser and an optical modulator for modulating the output of the laser. The laser output can be modulated in frequency, phase, and/or polarization. A bandpass filter can be included in the input optical port to select one channel from a WDM signal for monitoring. By including compensators that adjust the gain, phase, or polarization of the optical input signal as a function of wavelength, the monitor of the present invention can be utilized as an optical signal compensation processor.

DETAILED DESCRIPTION OF THE INVENTION

Figure 1:
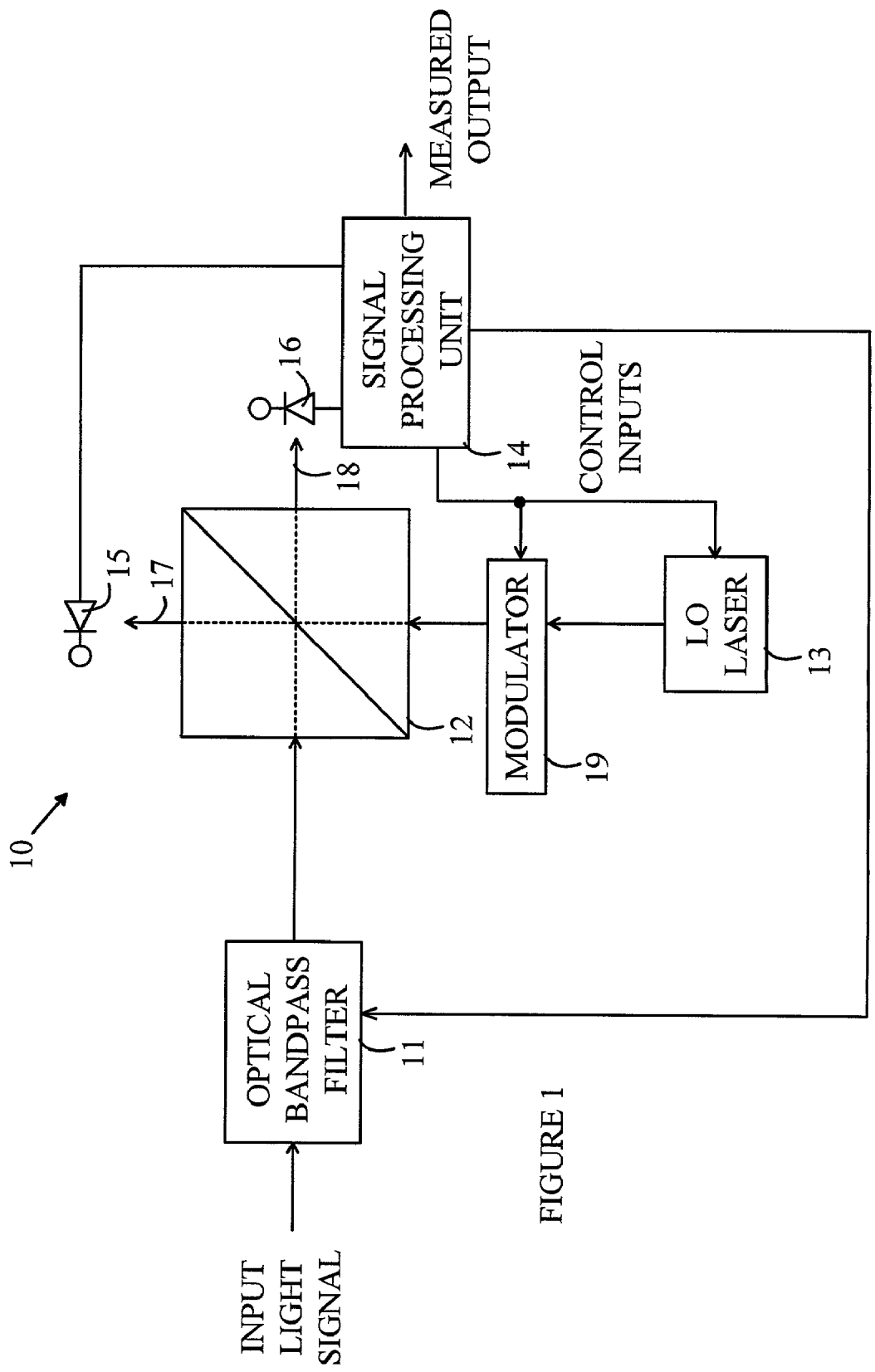
FIG. 1 is a schematic drawing of an optical monitor 10 according to the present invention.

The present invention is a monitoring device that enables the measurement of the optical spectrum, chromatic dispersion, polarization mode dispersion, and other signal impairments such as non-linear spectral impairments in optical signals. The manner in which the present invention operates may be more easily understood with reference to FIG. 1, which is a schematic drawing of an optical monitor 10 according to the present invention.

For the purposes of this discussion, it will be assumed that the input signal consists of a wavelength-division multiplexed (WDM) optical signal and that measurements of the parameters associated with one of the WDM channels are to be made. The WDM signal typically consists of bands that are 30 GHz wide separated by 100 GHz.

Monitor 10 selects the desired channel by blocking the non-selected channels with an optical bandpass filter 11 whose center wavelength and bandwidth are set by a control signal from signal processing unit 14. The output of filter 11 forms one of the inputs to a polarization dependent beam splitter 12 that separates the light of interest into signals having orthogonal polarizations. One of these signals leaves beam splitter 12 via path 17, and the other leaves beam splitter 12 via path 18.

Beam splitter 12 also has a local oscillator input that receives a signal from a "local oscillator laser" shown at 13. The wavelength and signal strength of the output of laser 13 is controlled by signal processor 14. The output light from laser 13 is also split into its component polarizations by beam splitter 12. In the preferred embodiment of the present invention, the output of laser 13 has a linear polarization that is 45 degrees to that selected by beam splitter 12. Hence, each path receives a LO signal of equal intensity.

Each of the LO laser components split by beam splitter 12 is then mixed with the signal of like polarization from the input signal. Hence, photodetector 15 measures the intensity of the mixed signal at the first polarization, and photodetector 16 measures the intensity of the mixed signal at the orthogonal polarization.

The input light signal in the desired channel consists of a narrow optical band of wavelengths about the center band of the channel. If the output of the LO laser is set to a wavelength equal to the minimum wavelength in this band, the output from the detector will include an RF signal having a bandwidth equal to that of the optical band. Hence, by measuring the amplitude as a function of frequency in the output of each detector, signal processor 14 can determine the shape of the optical band at each polarization.

The analysis can be performed by measuring the amplitude of the detector output in a narrow band using an appropriate signal filter and as a function of the LO laser wavelength. The output of the filter is measured as the LO laser wavelength is swept over the range of frequencies in the optical band of interest. LO lasers capable of being swept in this manner are known to the art, and hence, will not be discussed in detail here. Such lasers are available from Agilent Technologies and Focus, Inc.

Since the intensity of the output of laser 13 can be ascertained by measuring the output of the photodetectors in the absence of an input light signal, parameters such as dispersion accumulation, polarization variations, and power per channel can be measured.

Signal processing can be further enhanced by including an optical modulator 19 such as a $LiNbO_3$ modulator in monitor 10. Modulator 19 can be used to pulse the LO laser synchronously with the input signal, and hence, monitor 10 can measure the signal parameters in specific time domain portions of the input signal.

In addition, modulator 19 can be configured to modulate the phase, amplitude, or frequency of the LO laser output. The frequency modulation provides another method for sweeping the LO laser output wavelength across the communication channel band.

Figure 2:
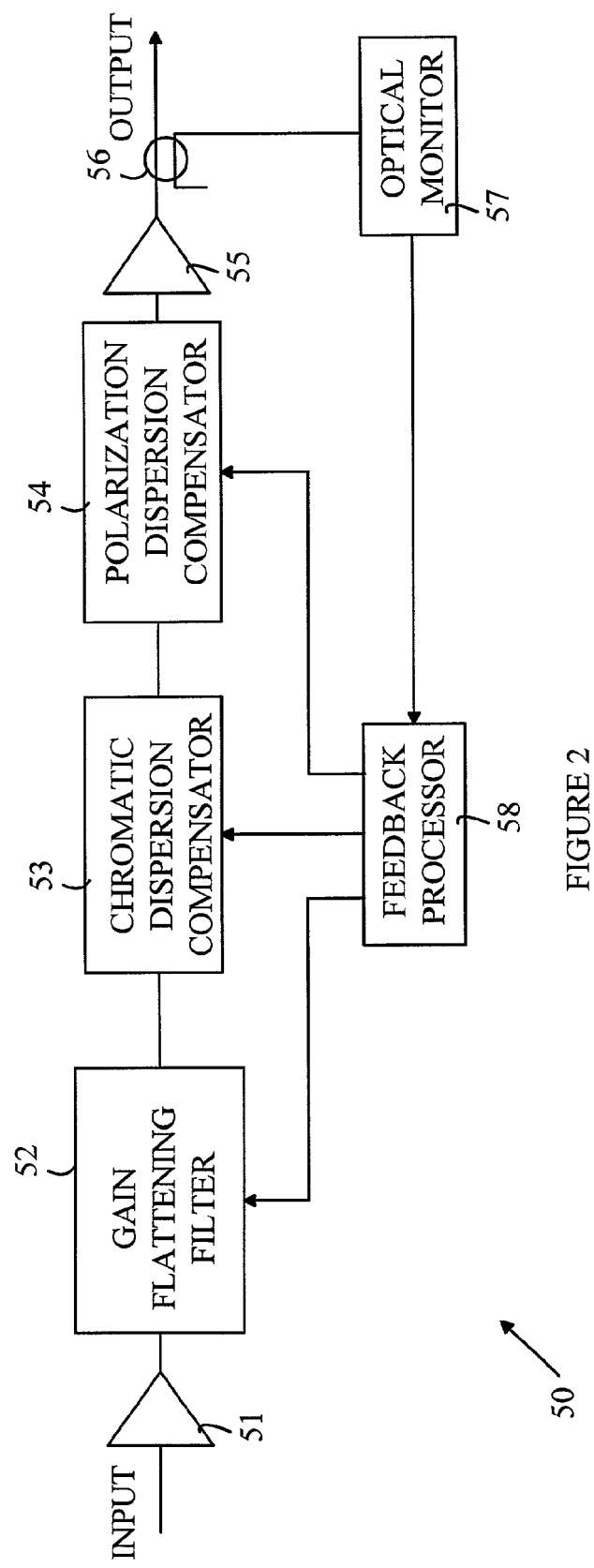
FIG. 2 is a schematic drawing of a signal compensating circuit 50 that utilizes a multifunction module optical monitor 57 according to the present invention.

A monitor according to the present invention can be incorporated into a signal compensation circuit to correct for the various parameters measured by the monitor. Refer now to FIG. 2, which is a schematic drawing of a signal compensating circuit 50 that utilizes a multifunction module optical monitor 57 according to the present invention. Optical monitor 57 measures the spectral shape, chromatic dispersion, and polarization dispersion in the output signal and provides that data to a feedback processor 58. Feedback processor 58 controls a gain flattening filter 52, a chromatic dispersion compensator 53, and a polarization dispersion compensator 54 that are used to correct the various signal impairments detected by optical monitor 57. The chromatic dispersion compensator alters the phase of the light signal as a function of wavelength. The gain-flattening filter alters the amplitude of the light signal as a function of wavelength, and the polarization mode dispersion compensator alters the relative delays of the constituent polarizations of the light signal as a function of wavelength. Since such compensators are known to the art, they will not be discussed in more detail here. Companies such as Novera-Optics, Yafo and Phaethon produce compensators of the types described above. Amplifiers 51 and 55 correct for the signal losses introduced by the fiber, compensation modules and optical tap 56.

Various modifications to the present invention will become apparent to those skilled in the art from the foregoing description and accompanying drawings. Accordingly, the present invention is to be limited solely by the scope of the following claims.

What is claimed is:

1. An optical monitor comprising:
a polarization dependent beam splitter having a signal input port, a mixing signal input, a first output port and a second output port, said signal input port adapted for receiving an input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;
first and second light detectors for receiving said first and second output optical signals and generating electrical signals therefrom;
a mixing optical signal light source for generating said mixing optical signal and coupling said mixing optical signal to said mixing signal input; and
a processor for generating a signal indicative of at least two optical properties of said input optical signal.

2. An optical monitor comprising:
a polarization dependent beam splitter having a signal input port, a mixing signal input, a first output port and a second output port, said signal input port adapted for receiving an input optical signal having first and second orthogonal polarization components, said mixing signal input being adapted for receiving an optical mixinim signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;
first and second light detectors for receiving said first and second output optical signals and generating electrical signals therefrom;
a mixing optical signal light source for generating said mixing optical signal and coupling said mixing optical signal to said mixing signal input; and
a processor for generating a signal indicative of at least two optical properties of said input optical signal,
wherein one of said optical properties comprises the polarization of said input optical signal as a function of wavelength.

3. An optical monitor comprising:
a polarization dependent beam splitter having a signal input port, a mixing signal input, a first output port and a second output port, said signal input port adapted for receiving an input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;

first and second light detectors for receiving said first and second output optical signals and generating electrical signals therefrom;

a mixing optical signal light source for generating said mixing optical signal and coupling said mixing optical signal to said mixing signal input; and a processor for generating a signal indicative of at least two optical properties of said input optical signal, wherein one of said optical properties comprises the relative phase of said input optical signal as a function of wavelength.

4. An optical monitor comprising:

a polarization dependent beam splitter having a signal input port, a mixing signal input, a first output port and a second output port, said signal input port adapted for receiving an input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;

first and second light detectors for receiving said first and second output optical signals and generating electrical signals therefrom;

a mixing optical signal light source for generating said mixing optical signal and coupling said mixing optical signal to said mixing signal input; and a processor for generating a signal indicative of at least two optical properties of said input optical signal, wherein one of said optical properties comprises the amplitude of said input optical signal as a function of wavelength.

5. An optical monitor comprising:

a polarization dependent beam splitter having a signal input port, a mixing signal input, a first output port and a second output port, said signal input port adapted for receiving an input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising sum of said first polarization components of said input optical signal and said optical mixing signal, and said second output signal comprising the sum of said second polarization components of said optical signal and said optical mixing signal;

first and second light detectors for receiving said first and second output optical signals and generating electrical signals therefrom;

a mixing optical signal light source for generating said mixing optical signal and coupling said mixing optical signal to said mixing signal input; and a processor for generating a signal indicative of at least two optical properties of said input optical signal, wherein said mixing optical signal light source comprises a laser for generating a laser light signal and an optical modulator for modulating the phase of said laser light signal.

6. An optical monitor comprising:

a polarization dependent beam splitter having a signal input port, a mixing signal input, a first output port and a second output port, said signal input port adapted for receiving an input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;

first and second light detectors for receiving said first and second output optical signals and generating electrical signals therefrom;

a mixing optical signal light source for generating said mixing optical signal and coupling said mixing optical signal to said mixing signal input; and a processor for generating a signal indicative of at least two optical properties of said input optical signal, wherein said mixing optical signal light source comprises a laser for generating a laser light signal and an optical modulator for modulating the amplitude of said laser light signal.

7. An optical monitor comprising:

a polarization dependent beam splitter having a signal input port, a mixing signal input a first output port and a second output port, said signal input port adapted for receiving an input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;

first and second light detectors for receiving said first and second output optical signals and generating electrical signals therefrom;

a mixing optical signal light source for generating said mixing optical signal and coupling said mixing optical signal to said mixing signal input; and a processor for generating a signal indicative of at least two optical properties of said input optical signal, wherein said mixing optical signal light source comprises a laser for generating a laser light signal and an optical modulator for modulating the wavelength of said laser light signal.

8. The optical monitor of claim 1 further comprising an input bandpass filter for generating said input optical signal by selecting light in a predetermined optical band from a WDM signal having light in a plurality of optical bands.

9. An optical monitor comprising:

a polarization dependent beam splitter having a signal input port, a mixing signal input, a first output port and a second output port, said signal input port adapted for receiving an input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;

first and second light detectors for receiving said first and second output optical signals and generating electrical signals therefrom;

a mixing optical signal light source for generating said mixing optical signal and coupling said mixing optical signal to said mixing signal input; and a processor for generating a signal indicative of at least two optical properties of said input optical signal, said optical monitor further comprising a filter for altering the gain of said input optical signal as a function of wavelength.

10. A signal compensation circuit comprising:

a monitor comprising:

a polarization dependent beam splitter having a signal input port, a mixing signal input, a first output port and a second output port, said signal input port adapted for receiving an input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;

first and second light detectors for receiving said first and second output optical signals and generating electrical signals therefrom;

a mixing optical signal light source for generating said mixing optical signal and coupling said mixing optical signal to said mixing signal input; and a phase compensator for altering the phase of said input optical signal as a function of wavelength.

11. The signal compensation circuit of 10 further comprising a polarization compensator for altering one of said polarization components of said input optical signal as a function of wavelength.

12. A method for measuring a input optical signal, said method comprising:

providing a polarization dependent beam splitter having a signal input port, a mixing signal input, a first output port and a second output port, said signal input port adapted for receiving said input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;

providing first and second light detectors for receiving said first and second output optical signals and generating electrical signals therefrom;

providing a mixing optical signal light source for generating said mixing optical signal and coupling said mixing optical signal to said mixing signal input; and generating a signal indicative of at least two optical properties of said input optical signal.

13. A method for measuring a input optical signal, said method comprising:

providing a polarization dependent beam splitter having a signal input port, a mixing signal input, a first output port and a second output port, said signal input port adapted for receiving said input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;

providing first and second light detectors for receiving said first and second output optical signals and generating electrical signals therefrom;

providing a mixing optical signal light source for generating said mixing optical signal and coupling said mixing optical signal to said mixing signal input; and generating a signal indicative of at least two optical properties of said input optical signal, wherein one of said optical properties comprises the polarization of said input optical signal as a function of wavelength.

14. A method for measuring a input optical signal, said method comprising:

providing a polarization dependent beam splitter having a signal input port, a mixing signal input, a first output port and a second output port, said signal input port adapted for receiving said input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal and said second output signal comprising the sum of said second polarization components of said optical signal and said optical mixing signal;

providing first and second light detectors for receiving said first and second output optical signals and generating electrical signals therefrom;

providing a mixing optical signal light source for generating said mixing optical signal and coupling said mixing optical signal to said mixing signal input; and generating a signal indicative of at least two optical properties of said input optical signal, wherein one of said optical properties comprises the relative phase of said input optical signal as a function of wavelength.

15. A method for measuring a input optical signal, said method comprising:

providing a polarization dependent beam splitter having a signal input port, a mixing signal input, a first output port and a second output port, said signal input port adapted for receiving said input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;

providing first and second light detectors for receiving said first and second output optical signals and generating electrical signals therefrom;

providing a mixing optical signal light source for generating said mixing optical signal and coupling said mixing optical signal to said mixing signal input; and generating a signal indicative of at least two optical properties of said input optical signal, wherein one of said optical properties comprises the amplitude of said input optical signal as a function of wavelength.

16. A method for measuring a input optical signal, said method comprising:

providing a polarization dependent beam splitter having a signal input port, a mixing signal input, a first output port and a second output port, said signal input port adapted for receiving said input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;

providing first and second light detectors for receiving said first and second output optical signals and generating electrical signals therefrom;

providing a mixing optical signal light source for generating said mixing optical signal and coupling said mixing optical signal to said mixing signal input; and generating a signal indicative of at least two optical properties of said input optical signal, wherein said mixing optical signal light source comprises a laser for generating a laser light signal and an optical modulator for modulating the phase of said laser light signal.

17. A method for measuring a input optical signal, said method comprising:

providing a polarization dependent beam splitter having a signal input port, a mixing signal input, a first output port and a second output port, said signal input port adapted for receiving said input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;

providing first and second light detectors for receiving said first and second output optical signals and generating electrical signals therefrom;

providing a mixing optical signal light source for generating said mixing optical signal and coupling said mixing optical signal to said mixing signal input; and generating a signal indicative of at least two optical properties of said input optical signal, wherein said mixing optical signal light source comprises a laser for generating a laser light signal and an optical modulator for modulating the amplitude of said laser light signal.

18. A method for measuring a input optical signal, said method comprising:

providing a polarization dependent beam splitter having a signal input port, a mixing signal input, a first output port and a second output port, said signal input port adapted for receiving said input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;

providing first and second light detectors for receiving said first and second output optical signals and generating electrical signals therefrom;

providing a mixing optical signal light source for generating said mixing optical signal and coupling said mixing optical signal to said mixing signal input; and generating a signal indicative of at least two optical properties of said input optical signal, wherein said mixing optical signal light source comprises a laser for generating a laser light signal and an optical modulator for modulating the wavelength of said laser light signal.

19. The method of claim 12 further comprising an input bandpass filter for generating said input optical signal by selecting light in a predetermined optical band from a WDM signal having light in a plurality of optical bands.

20. A method for measuring a input optical signal, said method comprising:

providing a polarization dependent beam splitter having a signal input port, a mixing signal input, a first output port and a second output port, said signal input port adapted for receiving said input optical signal having first and second orthogonal polarization components, said mixing signal input being adapted for receiving an optical mixing signal having a first and second polarization component parallel to said first and second polarization components of said optical input signal, respectively, said polarization dependent beam splitter generating first and second output signals on said first and second output ports, respectively, said first output signal comprising the sum of said first polarization components of said input optical signal and said optical mixing signal, and said second output signal comprising the sum of said second polarization components of said optical signal and said optical mixing signal;

providing first and second light detectors for receiving said first and second output optical signals and generating electrical signals therefrom;

providing a mixing optical signal light source for generating said mixing optical signal and coupling said mixing optical signal to said mixing signal input; and generating a signal indicative of at least two optical properties of said input optical signal, said method further comprising providing a filter for altering the gain of said input optical signal as a function of wavelength.

* * * * *

UNITED STATES PATENT AND TRADEMARK OFFICE
CERTIFICATE OF CORRECTION

PATENT NO. : 7,068,944 B2 Page 1 of 1
APPLICATION NO. : 10/120925
DATED : June 27, 2006
INVENTOR(S) : Sorin It is certified that error appears in the above-identified patent and that said Letters Patent is hereby corrected as shown below:

In column 4, lines 34-35, in Claim 2, delete "mixinim" and insert -- mixing --, therefor.

In column 5, line 63, in Claim 5, insert -- the -- before "sum".

In column 6, line 46, in Claim 7, after "input" insert -- , --.

Signed and Sealed this

Fourteenth Day of November, 2006

JON W. DUDAS
*Director of the United States Patent and Trademark Office*